Jan. 11, 1966   J. BERNATH   3,229,235
THERMAL RADIANT ENERGY DETECTING DEVICE
Filed May 2, 1960   2 Sheets-Sheet 1
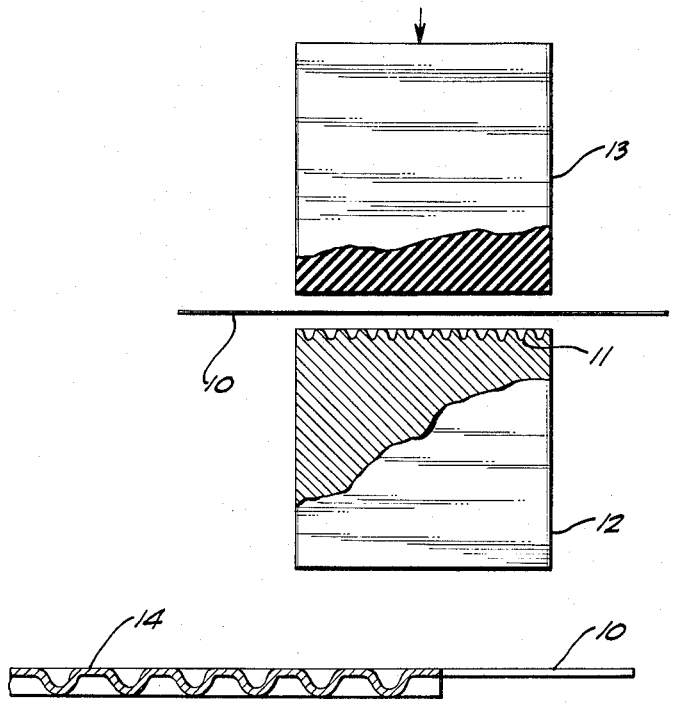
FIG. 1.
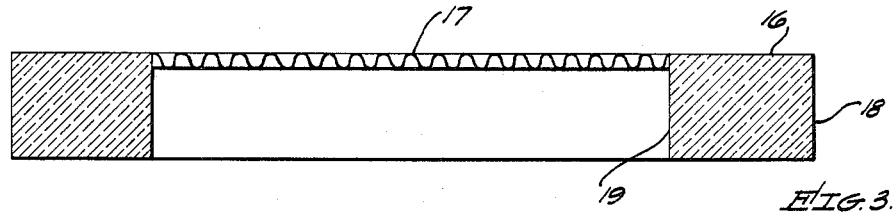
FIG. 2.
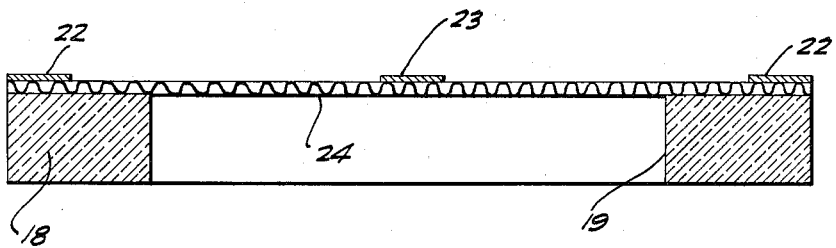
FIG. 3.
FIG. 4.
INVENTOR.
JOHN BERNATH,
BY John M. Koch
ATTORNEY.

Jan. 11, 1966   J. BERNATH   3,229,235
THERMAL RADIANT ENERGY DETECTING DEVICE
Filed May 2, 1960   2 Sheets-Sheet 2

INVENTOR.
JOHN BERNATH,
BY John M. Koch
ATTORNEY.

United States Patent Office 3,229,235
Patented Jan. 11, 1966

3,229,235
THERMAL RADIANT ENERGY
DETECTING DEVICE
John Bernath, Los Angeles, Calif., assignor to Hughes Aircraft Company, Culver City, Calif., a corporation of Delaware
Filed May 2, 1960, Ser. No. 26,263
2 Claims. (Cl. 338—18)

This invention relates to a device for detecting thermal radiation, more particularly to a bolometer for detecting thermal radiant energy, and especially such energy in the infrared region.

Thermal radiant energy detecting devices of the bolometer type employ a thin film of an electrical conductor, usually deposited upon a thin film of support material. The electrical conductor generally is deposited upon the support material in a vacuum evaporation-deposition operation conducted at elevated temperatures. The film of support material preferably should be made of a ceramic which will withstand elevated temperatures. Such ceramic support materials generally are quite brittle and fragile because they can be employed only in the form of thin films. Furthermore, the electrical conducting material, usually being a metal film, has a different coefficient of thermal expansion from that of the film of ceramic support material. In view of the fact that the metal film deposited upon the film of ceramic support is cooled from the elevated temperature of the evaporation-deposition operation to room or ambient temperatures, thermal stresses are built into the composite film consisting of the ceramic support film and the film of metallic electrical conductor. In addition, the resulting composite film generally is required to withstand severe mechanical stresses produced by vigorous mechanical vibration and extreme mechanical shock normally encountered in certain environments in which thermal radiation detecting devices are employed.

Accordingly, it is an important object of this invention to provide a thermal radiant energy detecting device characterized by having a composite support and electrical conductor film which is rugged and tough to the extent that it withstands extreme thermal and mechanical stresses.

Additional objects will become apparent from the following description which is given primarily for purposes of illustration and not limitation.

Stated in general terms, the objects of this invention are attained by providing a device for detecting thermal radiant energy comprising a ceramic support film which has been fabricated to have an unplanar film construction. By the term "unplanar" is meant to encompass support films having a wrinkled, embossed, dimpled, corrugated, quilted or the like, film structure and indicating an unflat, or irregular surface or thickness in the film structure. It has been found that such films withstand a great deal more thermal and mechanical stresses than the films having a flat, regular or planar structure. A thin film of suitable electrical conducting material, such as a suitable film of metallic electrical conductor, is employed in combination with the irregular surfaced ceramic support film.

The present invention also includes a method for preparing a thermal radiant energy detecting device employing a composite film of electrical conductor support and an unplanar support film of electrical insulating material capable of withstanding elevated temperatures.

A more detailed description of a specific embodiment of my invention is given with reference to the accompanying drawing, wherein:

FIG. 1 is a side elevational view in section diagrammatically showing a sheet of aluminum foil disposed between a base form and a resilient pressure pad;

FIG. 2 is a similar view showing the sheet of aluminum foil after it has been provided with an unplanar surface;

FIG. 3 is a similar view showing a film of unplanar aluminum oxide produced from the sheet of unplanar aluminum foil of FIG. 2 and mounted upon a quartz substrate;

FIG. 4 is a similar view showing a gold film conductor and electrode structure mounted upon the structure of FIG. 3 to form a bolometer;

Figure 5:
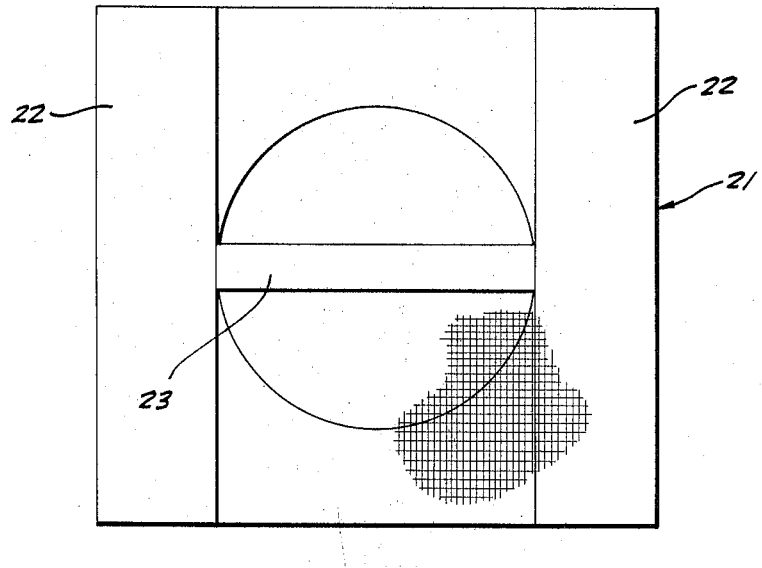
FIG. 5 is a top plan view of the bolometer structure shown in FIG. 4.
Figure 6:
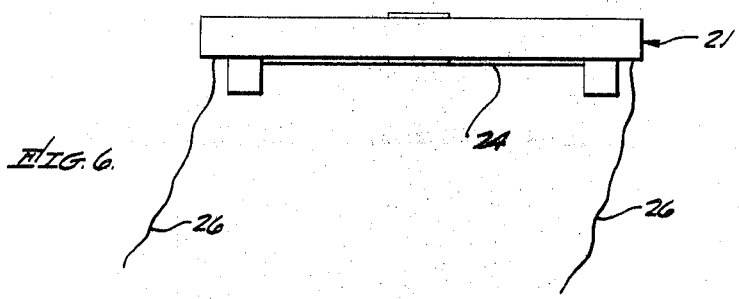
FIG. 6 is a diagrammatic view showing the bolometer structure of FIG. 5 mounted in an infrared radiation detector device.

The bolometer structure, best shown in FIGS. 4 and 5, preferably is produced by procuring a sheet 10 (FIG. 1) of clean aluminum foil, such as the type available on the market for wrapping various food items, cooking and other kitchen purposes. The sheet of aluminum foil 10 is provided with an unplanar structure by placing it upon a rigid embossing, corrugating or similar unplanar surface 11, supported on a block 12 and applying pressure on the foil 10 by applying thereto a resilient pressure pad or rubber block 13. The resulting sheet 10 of alminum foil thus has formed therein an unplanar structure as shown at 14 in FIG. 2.

The resulting unplanar aluminum foil 10 is anodized by any suitable method, such as by immersing it in a dibasic sodium citrate solution containing about 30 gms. of the citrate per liter of water and applying a D.C. current to the aluminum foil while thus immersed. The anodizing operation is performed while maintaining the electric current below about 100 ma. for a period of time during which the resistance of the foil steadily increases. The anodizing operation usually is concluded when the resistance of the foil is such that a voltage of about 180 volts is required for a current of about 50 ma.

The resulting sheet of anodized aluminum foil, which contains an upper film of aluminum oxide and a lower film of aluminum oxide, with metallic aluminum therebetween, is mounted upon a temporary substrate, such as a metal ring, for the purpose of rigidity supporting a section of the thus anodized foil. A drop of aqueous saturated potassium hydroxide solution is placed upon the upper anodized surface of the foil and permitted to remain there for about 8 minutes, or until the solution has dissolved the upper coating of aluminum oxide. The remaining potassium hydroxide solution then is washed from the treated section.

The thus treated section is immersed in a dilute hydrochloric acid solution to dissolve the metallic aluminum from the lower aluminum oxide film. This normally requires about 1.5 minutes and results in the production of an unplanar film of aluminum oxide. The resulting unplanar aluminum oxide film, which retains the structure of the unplanar alminum film as shown in FIG. 2, is rinsed in water to remove all traces of hydrochloric acid and other impurities.

The thus purified unplanar aluminum oxide film, having a flat, planar portion 16 and an embossed, unplanar portion 17, is mounted upon a permanent support, such as a square quartz substrate 18 having a circular aperture 19 therethrough. However, it is not necessary for the unplanar type film to have any flat area 16. Capillary action between the substrate and the wet film overcomes this need. Any protruding edges of aluminum oxide film are trimmed from the outer edges of the square quartz substrate. A suitable mask is placed upon the exposed surface 16, 17 of the aluminum oxide film to expose an H-shaped area thereof.

The resulting structure is introduced into a vapor-deposition apparatus of conventional type for the deposition of a film of gold 21 in the form of an H upon the exposed area of the aluminum oxide film, as best shown in FIG. 5. After the deposition of the gold film 21 at elevated temperatures in a conventional manner and cooling to room temperature, the resulting structure contains two parallel spaced electrodes 22 joined by a narrow conductor strip of gold film 23 at right angles and centrally of the electrodes.

The resulting structure generally is provided with a film of black, such as nickel black. This operation also is carried out in a vapor-deposition apparatus in conventional form and by a procedure of the type well known in the art. The layer of black is applied to the surface 24 of the aluminum oxide film 17 opposite that upon which the gold film conductor strip 23 has been deposited. The resulting bolometer structure is electrically connected in a suitable electrical circuit by attaching one electrical lead 26 to each of the respective electrodes 22.

It has been found that the resulting composite unplanar film bolometer structure is quite strong, very durable and relatively rugged and safely withstands thermal and mechanical stresses which cause a composite film of planar, or flat, aluminum oxide and gold to fracture. Also, the unplanar aluminum oxide support film can be made thinner than the flat, planar aluminum oxide support film for similar applications in bolometers. Furthermore, composite films of the type described hereinabove in actual practice showed improved reduced resistance and reduced noise characteristics as compared to planar composite films produced by prior art methods and containing planar aluminum oxide supporting films.

It will be understood that although the thermal radiant energy detecting device and method given above refers to the use of an aluminum oxide support film, other temperature resistant support films can be used. In general, thermal radiant energy transmitting materials which satisfactorily withstand vapor-deposition temperatures can be used. Ceramic materials having such characteristics are preferred because they are generally temperature resistant and have low electrical conductives. Among such ceramic materials are various metal oxides which preferably are vitrified, including silicon dioxide, quartz, sapphire, fluorite and various glasses, glazes and porcelains.

Also, it will be understood that the ceramic support material can be combined with the electrical conducting film in a manner different from the method given in detail hereinabove. For example, a ceramic support material, such as quartz or silicon dioxide, aluminum oxide, etc., can be deposited upon an electrical conductor, such as a precious metal of desired configuration, by the use of an evaporation condensation method. In such method the ceramic material is vaporized in a vacuum and deposited upon the electrical conductor. Similarly, the device and method of the invention are not limited to the use of gold as the electrical conductor, but other electrical conducting films of metals, such as copper, silver, etc., as well as other suitable electrical conductors are contemplated within the scope of the device and method of the invention. Furthermore, blacks other than nickel black also can be used with the various combinations of electrical conductors and ceramic support films described above.

Obviously, many other modifications and variations of the present invention are possible in the light of the above teachings. It is, therefore, to be understood that within the scope of the appended claims the invention can be practised otherwise than as specifically described.

What is claimed is:

1. A device for detecting thermal radiant energy consisting of a very thin aluminum oxide film having an upper surface and a lower surface, at least one of said surfaces being unplanar to withstand mechanical and thermal stresses, a film of metallic electrical conductor in the form of a narrow band deposited upon one of the surfaces of the aluminum oxide film, and a pair of electrodes electrically connected in spaced relationship to each other to the film of metallic electrical conductor.

2. A device for detecting thermal radiant energy consisting of a very thin film of aluminum oxide having an upper surface and a lower surface, at least one of said surfaces being unplanar to withstand mechanical and thermal stresses, a film of gold in the form of a narrow band deposited upon one of the surfaces of the aluminum oxide film, and a pair of electrodes connected to the film of gold.

References Cited by the Examiner

UNITED STATES PATENTS

| 1,984,112 | 12/1934 | Buchholz | 338—16 |
|---|---|---|---|
| 2,237,006 | 4/1941 | Koller | 338—308 X |
| 2,516,873 | 8/1950 | Havens et al. | 338—18 |
| 2,628,927 | 2/1953 | Colbert et al. | 338—308 X |
| 2,727,118 | 12/1955 | Longini et al. | 338—18 |
| 2,837,619 | 6/1958 | Stein | 338—308 X |
| 2,875,308 | 2/1959 | Tarbes | 338—16 |
| 2,980,813 | 4/1961 | Garbuny | 338—18 |
| 2,994,053 | 7/1961 | De Waard | 338—18 |
| 3,013,328 | 12/1961 | Beggs | 29—155.7 |
| 3,022,570 | 2/1962 | Taylor | 29—155.7 |
| 3,034,010 | 5/1962 | Garbuny | 338—18 |

OTHER REFERENCES

"An Evaporated Gold Bolometer," by E. Archbold, Journal of Scientific Instruments, volume 34, June 1957 (pages 240–242).

RICHARD M. WOOD, *Primary Examiner.*

ISAAC LISANN, *Examiner.*